(12) United States Patent
Karito et al.

(10) Patent No.: US 11,389,958 B2
(45) Date of Patent: Jul. 19, 2022

(54) ROBOT SYSTEM, ROBOT, AND CONTROL METHOD

(71) Applicant: Seiko Epson Corporation, Tokyo (JP)

(72) Inventors: Nobuhiro Karito, Kiso (JP); Kaoru Takeuchi, Azumino (JP); Yasuhiro Shimodaira, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 533 days.

(21) Appl. No.: 16/545,109

(22) Filed: Aug. 20, 2019

(65) Prior Publication Data

US 2020/0061816 A1 Feb. 27, 2020

(30) Foreign Application Priority Data

Aug. 21, 2018 (JP) .............................. JP2018-154486

(51) Int. Cl.
*B25J 9/00* (2006.01)
*B25J 9/16* (2006.01)
*B25J 13/08* (2006.01)

(52) U.S. Cl.
CPC ........... *B25J 9/1633* (2013.01); *B25J 9/0009* (2013.01); *B25J 9/1602* (2013.01); *B25J 13/085* (2013.01)

(58) Field of Classification Search
CPC ...... B25J 9/1633; B25J 9/0009; B25J 9/1602; B25J 13/085
See application file for complete search history.

(56) References Cited

U.S. PATENT DOCUMENTS

2017/0120450 A1* 5/2017 Toyoda .................. B25J 9/1666

FOREIGN PATENT DOCUMENTS

JP 2017-087313 A 5/2017
WO WO-0029175 A1 * 5/2000 ............ B25J 9/1692

* cited by examiner

*Primary Examiner* — Jamel E Williams
(74) *Attorney, Agent, or Firm* — Gang Yu

(57) ABSTRACT

A reset process includes: first processing for resetting a force detection unit; second processing for determining whether a peak output value from the force detection unit is equal to or greater than a predetermined first threshold value in a first period and updating a determination result; third processing for executing the first processing when the peak value is equal to or greater than the first threshold value; fourth processing for executing the second processing when the peak value is not equal to or greater than the first threshold value and a second period did not elapse from the timing when the force detection unit was reset; and fifth processing for calculating an average of the output values in a third period as a first offset value when the peak value is not equal to or greater than the first threshold value and the second period elapsed from the timing.

5 Claims, 6 Drawing Sheets

ROBOT SYSTEM, ROBOT, AND CONTROL METHOD

The present application is based on, and claims priority from, JP Application Serial Number 2018-154486, filed Aug. 21, 2018, the disclosure of which is hereby incorporated by reference herein in its entirety.

BACKGROUND

1. Technical Field

The present disclosure relates to a robot system, a robot, and a control method.

2. Related Art

Research and development have been conducted on a technology for causing a robot to perform work by force control.

In this regard, a robot device including: an arm; a force sensor that has a force detection unit that detects a force applied from the outside and is installed in a distal end portion of the arm; and an adjustment unit that executes zero point adjustment for setting a reference point of the force detected by the force sensor based on a detection result of the force sensor in a protected state while a state where a load on the force detection unit of the force sensor is unloaded is the protected state is known (refer to JP-A-2017-087313).

However, there is a case where the robot device cannot execute the zero point adjustment with high accuracy in such an environment where the force that is not a detection target applied from the outside of the robot device is applied to the force sensor.

SUMMARY

An aspect of the present disclosure is directed to a robot system including: a robot; a force detection unit that detects an external force applied to the robot; a reset processing unit that performs reset processing of the force detection unit; and a correction unit that performs correction corresponding to the reset processing by the reset processing unit, in which the reset processing includes first processing for resetting the force detection unit, second processing for determining whether or not a peak value of output values output from the force detection unit is equal to or greater than a predetermined first threshold value in a predetermined first period and updating a determination result, third processing for executing the first processing when the determination result indicates that the peak value is equal to or greater than the first threshold value, fourth processing for executing the second processing when the determination result indicates that the peak value is not equal to or greater than the first threshold value and a predetermined second period did not elapse from a timing at which the force detection unit is reset by the first processing, and fifth processing for calculating an average value of the output values in a predetermined third period as a first offset value when the determination result indicates that the peak value is not equal to or greater than the first threshold value and the second period elapsed from the timing, and in which the correction unit performs correction of adding or subtracting the first offset value to or from the output value after the reset processing when the fifth processing is executed by the reset processing unit.

Another aspect of the present disclosure is directed to a robot including: an arm; a force detection unit that detects an external force applied to the arm; a reset processing unit that performs reset processing of the force detection unit; and a correction unit that performs correction corresponding to the reset processing by the reset processing unit, in which the reset processing includes first processing for resetting the force detection unit, second processing for determining whether or not a peak value of output values output from the force detection unit is equal to or greater than a predetermined first threshold value in a predetermined first period and updating a determination result, third processing for executing the first processing when the determination result indicates that the peak value is equal to or greater than the first threshold value, fourth processing for executing the second processing when the determination result indicates that the peak value is not equal to or greater than the first threshold value and a predetermined second period did not elapse from a timing at which the force detection unit is reset by the first processing, and fifth processing for calculating an average value of the output values in a predetermined third period as a first offset value when the determination result indicates that the peak value is not equal to or greater than the first threshold value and the second period elapsed from the timing, and in which the correction unit performs correction of adding or subtracting the first offset value to or from the output value after the reset processing when the fifth processing is executed by the reset processing unit.

Still another aspect of the present disclosure is directed to a control method for controlling a robot including: reset processing for performing reset processing of a force detection unit that detects an external force applied to the robot; and correcting for performing correction corresponding to the reset processing in the reset processing, in which the reset processing includes first processing for resetting the force detection unit, second processing for determining whether or not a peak value of output values output from the force detection unit is equal to or greater than a predetermined first threshold value in a predetermined first period and updating a determination result, third processing for executing the first processing when the determination result indicates that the peak value is equal to or greater than the first threshold value, fourth processing for executing the second processing when the determination result indicates that the peak value is not equal to or greater than the first threshold value and a predetermined second period did not elapse from a timing at which the force detection unit is reset by the first processing, and fifth processing for calculating an average value of the output values in a predetermined third period as a first offset value when the determination result indicates that the peak value is not equal to or greater than the first threshold value and the second period elapsed from the timing, and in which the correcting performs correction of adding or subtracting the first offset value to or from the output value after the reset processing when the fifth processing is executed in the reset processing.

Figure 1:
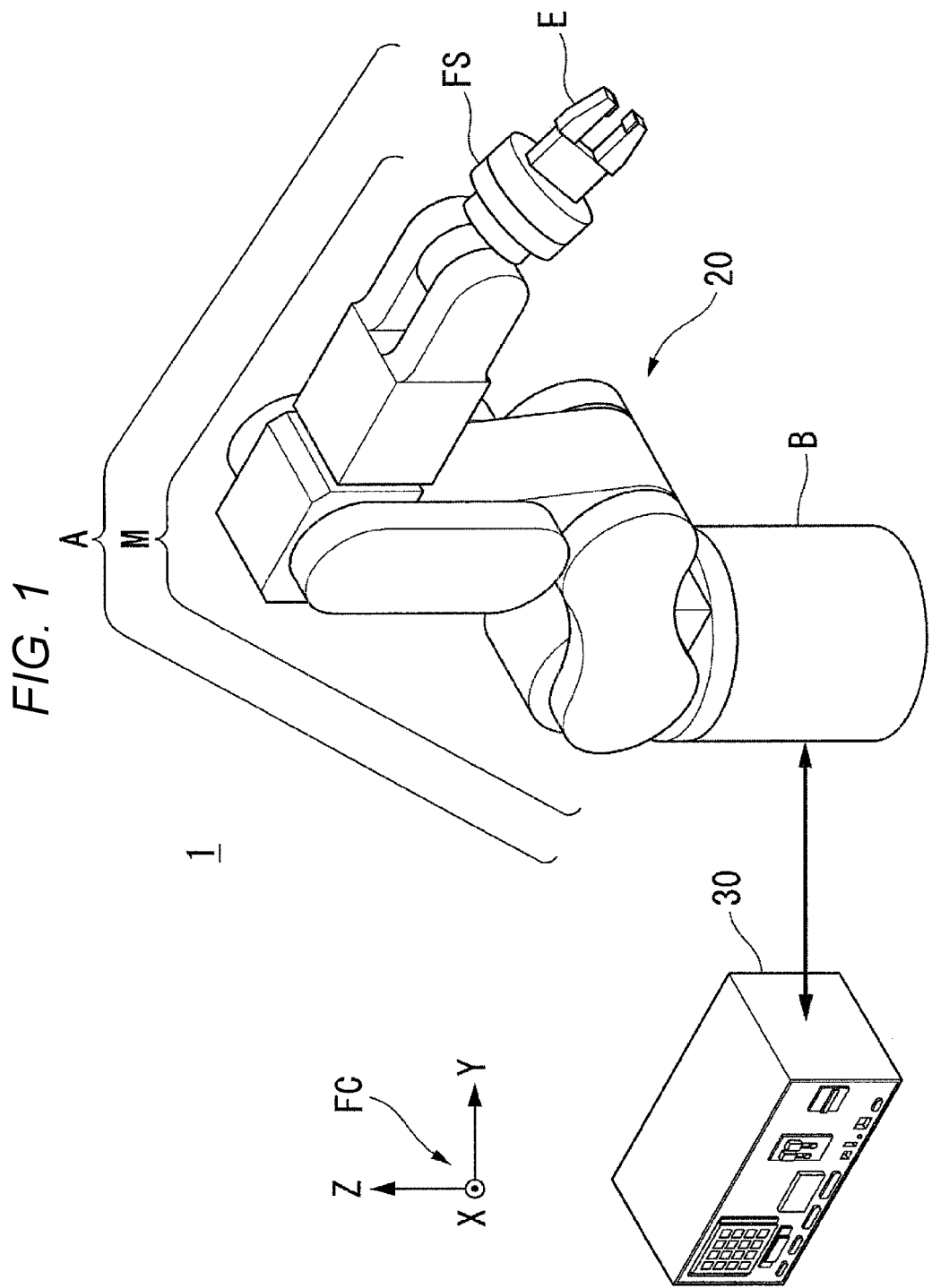
FIG. 1 is a view illustrating an example of a configuration of a robot system according to an embodiment.

DESCRIPTION OF EXEMPLARY
EMBODIMENTS

Embodiment

Hereinafter, an embodiment of the present disclosure will be described with reference to the drawings. In the following, for convenience of description, when certain processing is executed a plurality of times, the processing executed most recently from the present among the processing executed a plurality of times will be described as the processing executed immediately before.

Overview of Robot System

First, an overview of a robot system according to the embodiment will be described.

A robot system according to the embodiment includes: a robot; a force detection unit that detects an external force applied to the robot; a reset processing unit that performs reset processing of the force detection unit; and a correction unit that performs correction corresponding to the reset processing by the reset processing unit. The reset processing includes first processing, second processing, third processing, fourth processing, and fifth processing. The first processing is processing for resetting the force detection unit. The second processing is processing for determining whether or not a peak value of output values output from the force detection unit is equal to or greater than a predetermined first threshold value in a predetermined first period, and updating a determination result. The third processing is processing for executing the first processing when the determination result indicates that the peak value is equal to or greater than the first threshold value. The fourth processing is processing for executing the second processing when the determination result indicates that the peak value is not equal to or greater than the first threshold value, and a predetermined second period did not elapse from the timing at which the force detection unit is reset by the first processing. The fifth processing is processing for calculating an average value of the output values in a predetermined third period as a first offset value when the determination result indicates that the peak value is not equal to or greater than the first threshold value and the second period elapsed from the timing. Further, the correction unit performs correction of adding or subtracting the first offset value to or from the output value after the reset processing when the fifth processing is executed by the reset processing unit. Accordingly, even under an environment where vibration is applied to the force detection unit from the outside of the robot, the robot system can cause the robot to perform work with high accuracy by control based on the output value output from the force detection unit.

Hereinafter, a configuration of the robot system according to the embodiment and the reset processing performed by the robot system will be described in detail, respectively. In the following, for convenience of description, a difference between the minimum value of a certain value and the maximum value of the value in a certain period will be described as a peak value of the values in the period.

Configuration of Robot System

First, a configuration of a robot system 1 will be described.

FIG. 1 is a view illustrating an example of the configuration of the robot system 1 according to the embodiment. The robot system 1 is an example of the above-described robot system. The robot system 1 includes a robot 20 and a robot control device 30. In addition, the robot system 1 may be configured to include other devices in addition to the robot 20 and the robot control device 30. Other devices include an imaging device including an imaging unit, such as a camera, an image processing device that controls the imaging device, an information processing device that controls the robot control device 30, a teaching device that teaches the robot control device 30 to cause the robot 20 to operate, and the like.

The robot 20 is an example of the above-described robot. An arm A is a single-arm robot including a base B that supports the arm A. In addition, the robot 20 may be a multi-arm robot instead of a single-arm robot. Here, among the multi-arm robots, robots having two arms are also referred to as dual-arm robots. In other words, the robot 20 may be a double-arm robot having two arms, or may be a multi-arm robot having three or more arms. In addition, the robot 20 may be another robot. The other robots include a SCARA robot (horizontal articulated robot), an orthogonal coordinate robot, a cylindrical robot and the like.

The arm A includes an end effector E, a manipulator M, and a force detection unit FS. In addition, the arm A may be configured not to include the end effector E.

The end effector E is an end effector that holds an object. In this example, the end effector E includes a finger portion and holds the object by pinching and holding the object by the finger portion. Here, in the embodiment, the holding means that a state where it is possible to lift up the object. In addition, the end effector E may be configured to hold the object by lifting up the object by suction of air, magnetic force, other tools or the like, instead of the end effector that holds the object by the finger portion. Further, the end effector E may be an end effector that does not hold the object, instead of the end effector that holds the object. The end effector that does not hold the object includes, for example, an end effector provided with a dispenser that discharges a discharge object, such as grease and adhesive, and an end effector provided with a tool, such as an electric driver.

The manipulator M is a 6-shaft vertical articulated manipulator. In other words, the arm A is a 6-shaft vertical articulated arm. In addition, the manipulator M may be a vertical articulated manipulator having five or less shafts or may be a vertical articulated manipulator having seven or more shafts.

The force detection unit FS is an example of the above-described force detection unit. The force detection unit FS is provided between the end effector E and the manipulator M. The force detection unit FS includes, for example, four force detection elements including quartz crystal. In addition, the force detection unit FS detects the external force that acts on the hand (not illustrated) of the robot 20 based on a shear force applied to each of the four quartz crystals. Accordingly, the robot 20 can suppress that the output value output from the force detection unit FS changes in accordance with a change in environmental factors, such as temperature, aging deterioration, or the like, compared to a force sensor having four force detection elements that do not include the quartz crystal.

Here, the hand of the robot 20 is the end effector E or an object held by the end effector E. In other words, the force detection unit FS detects an external force that acts on the end effector E or an external force that acts on the object held by the end effector E. In other words, the force detection unit FS detects the external force applied to the arm A.

The external force that acts on the hand of the robot 20 includes a translational force for translating the hand. The translational force includes three types of translational forces, such as a first translational force, a second translational force, and a third translational force. The first translational force is a translational force that acts in an X-axis direction in a force detection coordinate system FC illustrated in FIG. 1. The force detection coordinate system FC is a three-dimensional orthogonal coordinate system that is associated with the force detection unit FS and moves together with the force detection unit FS in accordance with the movement of the robot 20. In FIG. 1, the force detection coordinate system FC is illustrated at a position away from the force detection unit FS in order to simplify the drawing. The second translational force is a translational force that acts in a Y-axis direction in the force detection coordinate system FC. The third translational force is a translational force that acts in a Z-axis direction in the force detection coordinate system FC.

In addition, the external force that acts on the hand of the robot 20 includes an angular moment (torque) for rotating the hand. The angular moment includes three types of angular moments, such as a first angular moment, a second angular moment, and a third angular moment. The first angular moment is an angular moment that acts around the X-axis in the force detection coordinate system FC. The second angular moment is an angular moment that acts around the Y-axis in the force detection coordinate system FC. The third angular moment is an angular moment that acts around the Z-axis in the force detection coordinate system FC.

The force detection unit FS detects each of the three types of translational forces and three types of angular moments as external forces that act on the hand of the robot 20. As the external force information, the force detection unit FS outputs information indicating each of six types of output values including the output values that correspond to each of the three types of detected translational forces and the output values that correspond to each of the three types of detected angular moments, to the robot control device 30.

Hereinafter, for convenience of description, the six types of output values output from the force detection unit FS will be described simply as six types of output values. Some or all of the six types of output values are examples of the output values output from the force detection unit. In addition, the force detection unit FS may be configured to output some types of output values among the six types of output values. In this case, the force detection unit FS detects some of the first translational force, the second translational force, the third translational force, the first angular moment, the second angular moment, and the third angular moment as an external force.

The external force information is used for force control of the robot 20 by the robot control device 30. The force control is control based on the output value output from the force detection unit FS, that is, control based on the external force information output from the force detection unit FS to the robot control device 30. For example, the force control refers to compliant motion control, such as impedance control.

In addition, the force detection unit FS may be configured to include three or less force detection elements including the quartz crystal, and may be configured to include five or more force detection elements including the quartz crystal. Further, the force detection unit FS may be configured to include a force detection element that does not include the quartz crystal, instead of some or all of the four force detection elements that include the quartz crystal.

The robot control device 30 causes the robot 20 to perform predetermined work based on an operation program stored in advance. At this time, for example, the robot control device 30 acquires the external force information from the force detection unit FS, and controls the robot 20 by the force control based on the acquired external force information. A control method by which the robot control device 30 causes the robot 20 to perform work may be a known method or may be a method to be developed hereinafter.

In addition, the robot control device 30 performs the reset processing of the force detection unit FS. The reset processing is processing for performing zero point adjustment of the output value output from the force detection unit FS. The reset processing is, for example, processing including the first processing to the fourth processing which will be described hereinafter. In addition, the reset processing may be configured to include other processing in addition to the first processing to the fourth processing.

The first processing is processing for resetting the force detection unit FS. In addition to the processing for resetting the force detection unit FS, the first processing may be configured to include other processing.

The second processing is processing for executing each time a first standby period shorter than the first period elapses in the first period from a timing T until the predetermined first period elapses. Here, the timing T indicates the timing at which the force detection unit FS is reset by the first processing executed immediately before. In addition, the second processing is processing for determining whether or not a peak value PK of the output values output from the force detection unit FS is equal to or greater than a predetermined first threshold value SH1 in a period P1 from the timing T up to the present timing, and updating a determination result each time the determination is performed. In other words, the determination result updated by the second processing indicates that the peak value PK is equal to or greater than the first threshold value SH1 or that the peak value PK is not equal to or greater than the first threshold value SH1. Here, the present timing indicates a timing at which the second processing is executed or a timing after the timing in a period during which the second processing is being performed. The peak value PK and the first threshold value SH1 will be described later, respectively. In addition, the second processing may be configured to include other processing in addition to the processing.

Hereinafter, a case where the first period is 300 milliseconds will be described as an example. In addition, the first period may be a period shorter than 300 milliseconds or may be a period longer than 300 milliseconds.

Hereinafter, a case where the first standby period is 10 milliseconds will be described as an example. In addition, the first standby period may be a period shorter than 10 milliseconds or may be a period longer than 10 milliseconds as long as the first standby period is shorter than the first period.

The third processing is processing for executing the first processing when the determination result updated by the second processing executed immediately before indicates that the peak value PK is equal to or greater than the first threshold SH1 within the above-described first period. In other words, the third processing is processing for executing the first processing when it is determined by the second processing that the peak value PK is equal to or greater than the first threshold SH1 in the first period. In other words, the third processing is processing for ending the second processing before the first period elapses after the timing T and executing the first processing again when it is determined by the second processing that the peak value PK is equal to or greater than the first threshold value SH1 during the period from the timing T until the first period elapses. Here, in the embodiment, being within the first period means being within a range from the timing T until the first period elapses. In addition, the third processing may be configured to include other processing in addition to the processing.

The fourth processing is processing for executing the second processing again when the determination result indicates that the peak value PK is not equal to or greater than the first threshold value SH1 and the predetermined second period did not elapse. The determination result is a determination result updated by the second processing executed immediately before. Here, the second period is a period equal to or shorter than the first period. Hereinafter, a case where the second period is the same period as the first period will be described as an example. In addition, the fourth processing may be configured to include other processing in addition to the processing.

The fifth processing is processing for calculating an average value of the output values output from the force detection unit FS in a predetermined third period as an offset value when the determination result indicates that the peak value PK is not equal to or greater than the first threshold value SH1 and the second period elapsed. The determination result is a determination result updated by the second processing executed immediately before. In addition, in the embodiment, being within the third period means being within a range from the timing T until the third period elapses. Hereinafter, a case where the third period is the same period as the first period will be described as an example. In addition, a part of the third period may be configured to overlap the first period. Further, the third period may be a period later than the first period among periods that do not overlap the first period.

In addition, in other words, the fifth processing is processing for calculating the average value of the output values output from the force detection unit FS in the third period as an offset value when it is not determined by the second processing that the peak value PK is equal to or greater than the first threshold value SH1 within the second period. In the embodiment, being within the second period means being within a range from the timing T until the second period elapses.

In addition, in other words, the fifth processing is processing for calculating the average value of the output values output from the force detection unit FS in the third period as an offset value when it is never determined by the second processing that the peak value PK is equal to or greater than the first threshold value SH1 from the timing T until the second period elapses. In addition, the fifth processing may be configured to include other processing in addition to the processing.

In addition, the robot control device 30 performs correction corresponding to the reset processing after performing the reset processing of the force detection unit FS. Specifically, the robot control device 30 performs correction of adding or subtracting the offset value calculated by the fourth processing to or from the output value output from the force detection unit FS in a period after the first period. Accordingly, even under an environment where vibration is applied to the force detection unit FS from the outside of the robot 20, the robot control device 30 can cause the robot 20 to perform work with high accuracy by control based on the output value output from the force detection unit FS.

Hardware Configuration of Robot Control Device

Figure 2:
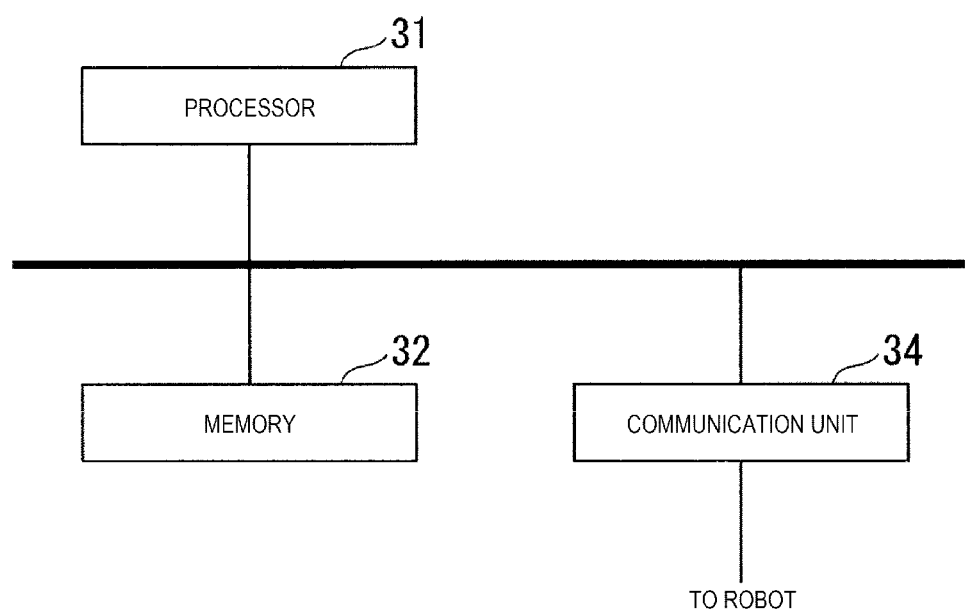
FIG. 2 is a view illustrating an example of a hardware configuration of a robot control device.

Hereinafter, a hardware configuration of the robot control device 30 will be described with reference to FIG. 2. FIG. 2 is a view illustrating an example of the hardware configuration of the robot control device 30.

The robot control device 30 includes, for example, a processor 31, a memory 32, and a communication unit 34. The configuration elements are connected to each other via a bus to be capable of communicating with each other. In addition, the robot control device 30 communicates with the robot 20 via the communication unit 34.

The processor 31 is, for example, a central processing unit (CPU). In addition, the processor 31 may be another processor, such as a field-programmable gate array (FPGA) instead of the CPU. The processor 31 executes various programs stored in the memory 32.

The memory 32 includes, for example, a hard disk drive (HDD), a solid state drive (SSD), an electrically erasable programmable read-only memory (EEPROM), a read-only memory (ROM), a random access memory (RAM), and the like. In addition, the memory 32 may be an external storage device connected by a digital input and output port, such as universal serial bus (USB), instead of a device built in the robot control device 30. The memory 32 stores various information processed by the robot control device 30, various images, various programs, and the like.

The communication unit 34 is configured to include, for example, a digital input and output port, such as a USB, an Ethernet (registered trademark) port, and the like.

In addition, the robot control device 30 may be configured to include an input device, such as a keyboard, a mouse, and a touch pad. Further, the robot control device 30 may be configured to include a display device including a liquid crystal display panel, an organic electroluminescence (EL) display panel, and the like.

Functional Configuration of Robot Control Device

Figure 3:
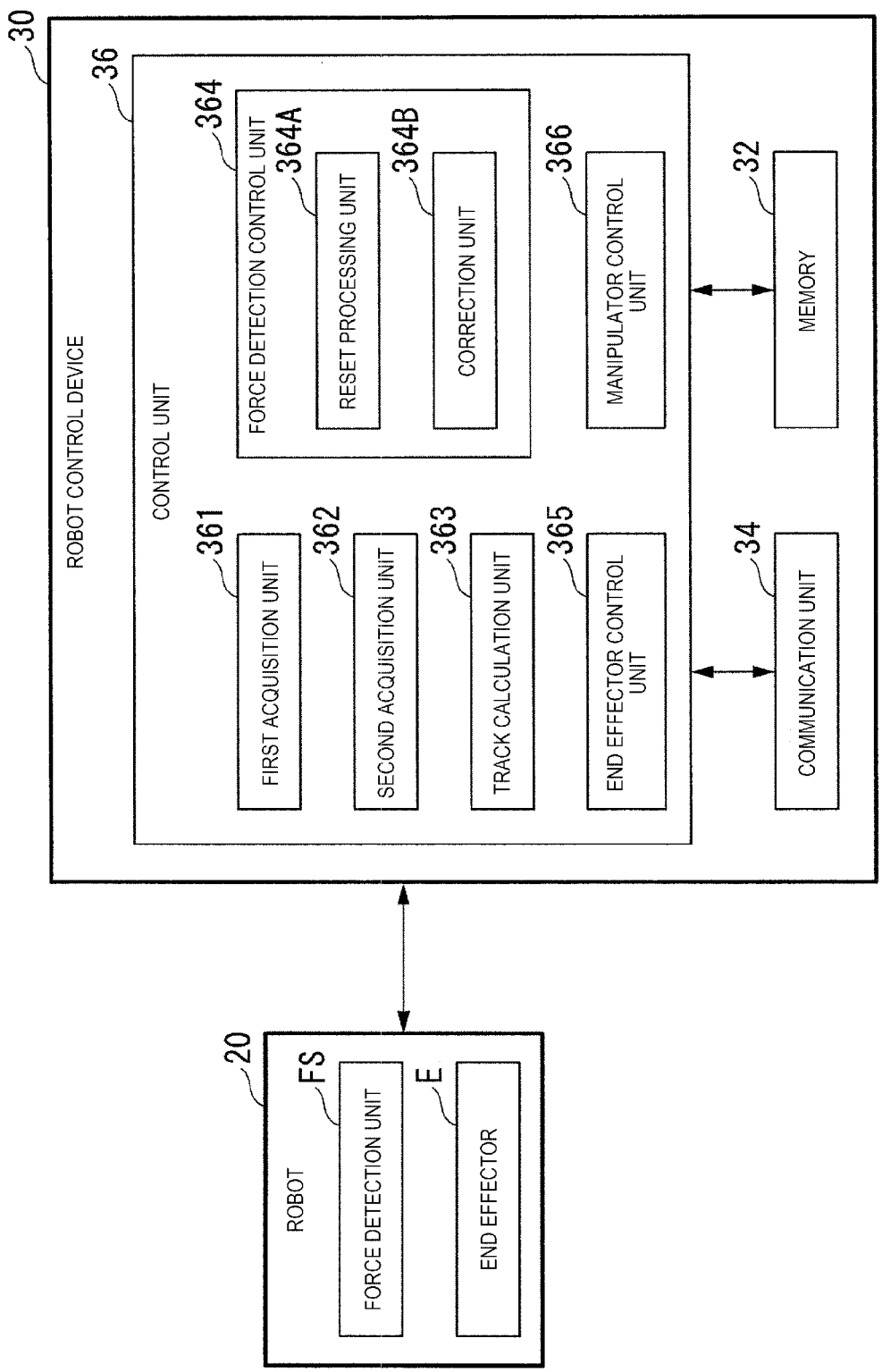
FIG. 3 is a view illustrating an example of a functional configuration of the robot control device.

Hereinafter, a functional configuration of the robot control device 30 will be described with reference to FIG. 3. FIG. 3 is a view illustrating an example of the functional configuration of the robot control device 30.

The robot control device 30 includes, for example, the memory 32, the communication unit 34, and a control unit 36.

The control unit 36 controls the entire robot control device 30. The control unit 36 includes a first acquisition unit 361, a second acquisition unit 362, a track calculation unit 363, a force detection control unit 364, an end effector control unit 365, and a manipulator control unit 366. The functional units included in the control unit 36 are realized, for example, as the processor 31 executes various instructions stored in the memory 32. Further, some or all of the functional units may be hardware functional units, such as a large scale integration (LSI) and an application specific integrated circuit (ASIC).

The first acquisition unit 361 acquires the external force information from the force detection unit FS.

The second acquisition unit 362 acquires rotation angle information indicating a rotation angle of a motor from an encoder provided in the motor, for each motor included in the manipulator M.

The track calculation unit 363 calculates a track in which the robot 20 moves based on the operation program stored in advance in the memory 32 and the rotation angle information acquired by the second acquisition unit 362. In the embodiment, the movement of the robot 20 is represented by the movement of a virtual point that moves together with the robot 20. Hereinafter, for convenience of description, the point will be described as a control point. The control point is, for example, a tool center point (TCP). In addition, the control point may be another virtual point that moves together with the robot 20 instead of the TCP. Further, a method by which the track calculation unit 363 calculates the track may be a known method or may be a method to be developed hereinafter.

The force detection control unit 364 controls the force detection unit FS. The force detection control unit 364 includes a reset processing unit 364A and a correction unit 364B.

The reset processing unit 364A performs the above-described reset processing.

The correction unit 364B corrects the output value output from the force detection unit FS in accordance with the reset processing by the reset processing unit 364A.

The end effector control unit 365 controls the end effector E. In addition, the end effector control unit 365 may be configured to be included in an information processing device separated from the robot control device 30, instead of the configuration included in the robot control device 30. In this case, the robot system 1 includes the information processing device.

The manipulator control unit 366 controls the manipulator M such that the control point moves along the track based on the track calculated by the track calculation unit 363. In addition, the manipulator control unit 366 also controls the manipulator M by force control based on the output value corrected by the correction unit 364B.

Reset Processing Performed by Robot Control Device

Figure 4:
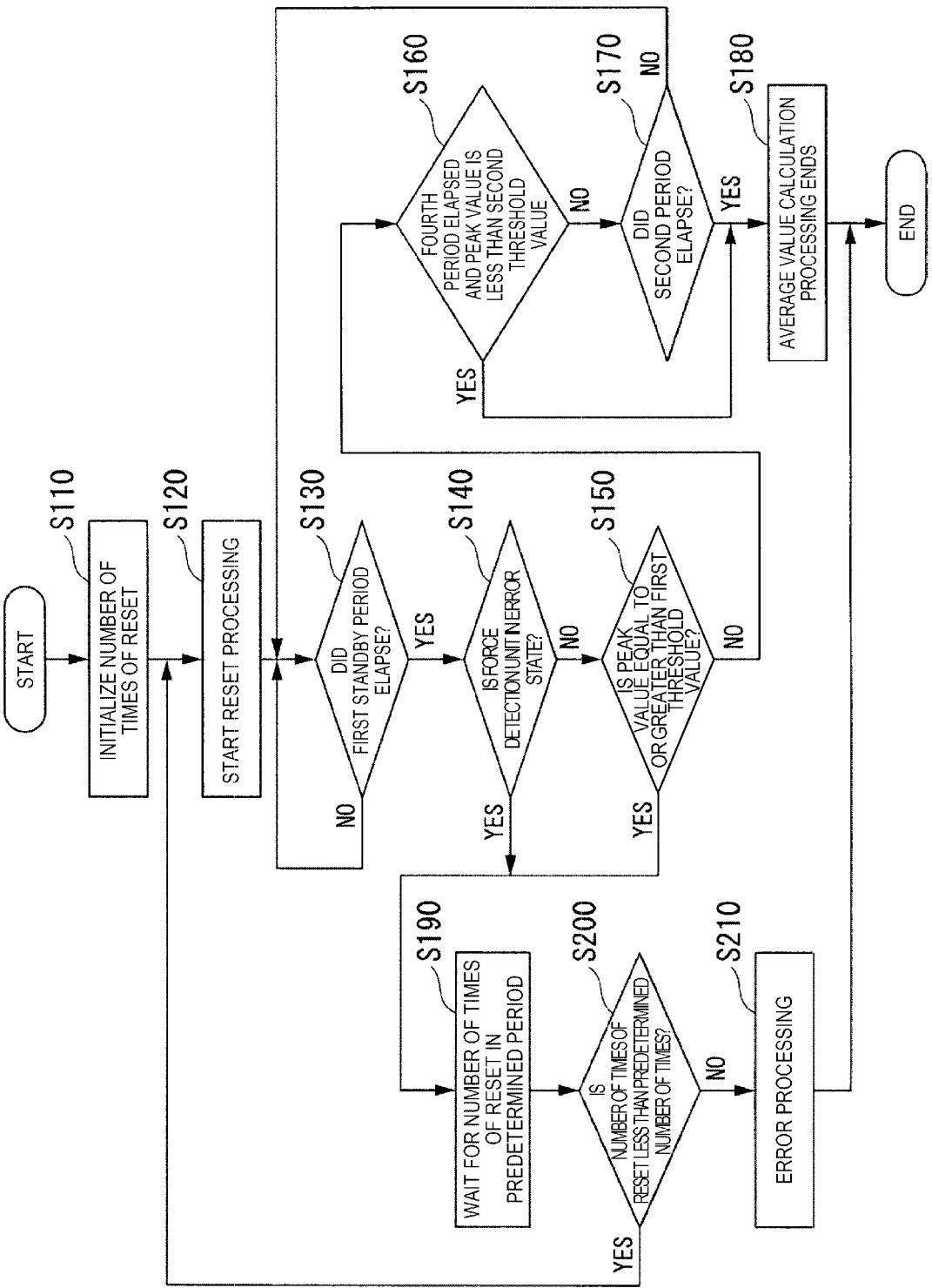
FIG. 4 is a view illustrating an example of a flow of reset processing performed by the robot control device.

Hereinafter, the reset processing of the robot control device 30 will be described with reference to FIG. 4. FIG. 4 is a view illustrating an example of a flow of the reset processing performed by the robot control device 30. The robot control device 30 executes the processing of the flowchart illustrated in FIG. 4 based on, for example, the operation program stored in advance in the memory 32. In addition, the robot control device 30 may be configured to execute the processing in accordance with the operation received from the user via another information processing device connected to the robot control device 30, and may be configured to execute the processing by another method.

The reset processing unit 364A initializes the number of times of reset (step S110). The number of times of reset is the number of times of reset of the force detection unit FS after the processing of the flowchart illustrated in FIG. 4 is executed until the processing is ended. In step S110, the reset processing unit 364A generates a variable X that stores the number of times of reset in a storage region of the memory 32. In addition, the reset processing unit 364A performs the processing for storing 0 for the generated variable X as initialization of the number of times of reset.

Next, the reset processing unit 364A starts the reset processing (step S120). Specifically, the reset processing unit 364A performs the above-described first processing in step S120. In other words, in step S120, the reset processing unit 364A resets the force detection unit FS. In addition, the reset processing unit 364A stores a value obtained by adding 1 to the value stored in the variable X initialized in step S110, in the variable X again. In other words, in step S120, the reset processing unit 364A updates the value stored in the variable X. In addition, in step S120, the reset processing unit 364A starts each of clocking processing, acquisition processing, average value calculation processing, and peak value calculation processing.

The clocking processing is processing executed each time the first processing is executed. In other words, in the embodiment, the clocking processing is processing executed each time the processing of step S120 is executed. In addition, the clocking processing is processing for clocking an elapsed time from the above-described timing T. In addition, the clocking processing may be configured to include other processing in addition to the processing.

The acquisition processing is processing executed each time a predetermined sampling cycle elapses. In addition, the acquisition processing is processing for causing the first acquisition unit 361 to acquire the external force information from the force detection unit FS. The first acquisition unit 361 associates the acquired external force information with the elapsed time information indicating the elapsed time counted by the clocking processing each time the external force information is acquired by the acquisition processing, and stores the information in the memory 32. In addition, the acquisition processing may be configured to include other processing in addition to the processing.

The average value calculation processing is, for example, processing executed each time the elapsed time is counted by the counting processing. In addition, the average value calculation processing is processing executed based on a plurality of pieces of external force information stored in the memory 32 in the above-described period P1. In other words, the average value calculation processing is processing executed based on the plurality of pieces of external force information stored in the memory 32 in the period P1 from the timing T to the timing at which the elapsed time is counted immediately before. In addition, the average value calculation processing is processing for calculating the average value of the output values output from the force detection unit FS in the period P1. Here, in the embodiment, the force detection unit FS outputs six types of output values as described above. Therefore, in the embodiment, the average value calculation processing is processing for calculating the average value of output values in the period P1 for each of the six types of output values.

Specifically, in the embodiment, the average value calculation processing is processing for calculating the six types of average values, such as the average value in the period of the output values that correspond to the first translational force, the average value in the period of the output values that correspond to the second translational force, the average value in the period of the output values that correspond to the third translational force, the average value in the period of the output values that correspond to the first angular moment, the average value in the period of the output values that correspond to the second angular moment, and the average value in the period of the output values that correspond to the third angular moment.

In addition, the average value calculation processing may be configured to include other processing in addition to the processing. Further, the average value calculation processing may be processing periodically or aperiodically executed at another timing, instead of the processing executed each time the elapsed time is counted by the clocking processing. In addition, the average value calculation processing may be processing for calculating some types of average values among the six types of average values. Further, the average value calculation processing may be processing for calculating other values based on the output values as an average value of the output values, for each of the six types of output values. The other values are a root-sum-square value of the output values, a variance of the output values, and the like.

The peak value calculation processing is, for example, processing executed each time the elapsed time is counted by the counting processing. In addition, the peak value calculation processing is processing executed based on the plurality of pieces of external force information stored in the memory 32 in the period P1. In other words, the peak value calculation processing is processing executed based on the plurality of pieces of external force information stored in the memory 32 in the period P1 from the timing T to the timing at which the elapsed time is counted immediately before. In addition, the peak value calculation processing is processing for calculating the peak value PK in the period P1. Here, in the embodiment, the force detection unit FS outputs six types of output values as described above. Therefore, in the embodiment, the peak value PK includes the six types of peak values, such as a first peak value, a second peak value, a third peak value, a fourth peak value, a fifth peak value, and a sixth peak value. The first peak value is a peak value in the period P1 of the output values that correspond to the first translational force. The second peak value is a peak value in the period P1 of the output values that correspond to the second translational force. The third peak value is a peak value in the period P1 of the output values that correspond to the third translational force. The fourth peak value is a peak value in the period P1 of the output values that correspond to the first angular moment. The fifth peak value is a peak value in the period P1 of the output values that correspond to the second angular moment. The sixth peak value is a peak value in the period P1 of the output values that correspond to the third angular moment. In other words, in the embodiment, the peak value calculation processing is processing for calculating each of the six types of peak values as the peak value PK. In addition, the peak value calculation processing may be processing for calculating some types of peak values among the six types of peak values. In this case, the peak value PK includes the peak values of the certain type.

In addition, the peak value calculation processing may be configured to include other processing in addition to the processing. Further, the peak value calculation processing may be processing periodically or aperiodically executed at another timing, instead of the processing executed each time the elapsed time is counted by the clocking processing. In addition, the peak value calculation processing may be processing for calculating the peak value of the output value for each of the output values of some of the six types of output values. Further, the peak value calculation processing may be processing for calculating other values based on the output values as a peak value, for each of the six types of output values. The other values are the maximum value of the output values, the minimum value of the output values, the variance of the output values, and the like.

After the processing of step S120 is performed, the reset processing unit 364A waits until the first standby period elapses from the timing T (step S130).

When it is determined that the first standby period elapsed from the timing T (YES in step S130), the reset processing unit 364A determines whether or not the state of the force detection unit FS is an error state (step S140).

When it is determined that the state of the force detection unit FS is the error state (YES in step S140), the reset processing unit 364A waits for the number of times of reset in a predetermined period (step S190). Specifically, in this case, the reset processing unit 364A reads the value stored in the variable X stored in the memory 32 from the memory 32. In other words, the value is the number of times of reset. The reset processing unit 364A waits in step S190 during a period obtained by multiplying the read number of times of reset by a predetermined period. The predetermined period is, for example, 20 milliseconds. Further, the value to be multiplied by the predetermined period by the reset processing unit 364A in step S190 may be another value instead of the number of times of reset. In addition, the reset processing unit 364A may be configured to wait for a predetermined period in step S190. In addition, the predetermined period may be a period shorter than 20 milliseconds or may be a period longer than 20 milliseconds.

After the processing of step S190 is performed, the reset processing unit 364A refers to the variable X stored in the memory 32, and determines whether or not the number of times of reset stored in the variable X is less than the predetermined number of times (step S200). The predetermined number of times is, for example, 15 times. In addition, the predetermined number of times may be less than 15 times or may be more than 15 times.

When it is determined that the number of times of reset stored in the variable X is less than the predetermined number (YES in step S200), the reset processing unit 364A transitions to step S120 and starts the reset processing again. Meanwhile, when it is determined that the number of times of reset stored in the variable X is equal to or greater than 15 times (No in step S200), the reset processing unit 364A performs the error processing (step S210). The error processing is, for example, processing for outputting information indicating that the reset processing failed to be ended normally. In addition, the error processing may be other processing performed corresponding to the failure of normal end of the reset processing. After the error processing is performed, the reset processing unit 364A ends the processing.

Meanwhile, when it is determined that the state of force detection unit FS is not the error state (No in step S140), the reset processing unit 364A determines whether or not the peak value PK calculated by the peak value calculation processing immediately before is equal to or greater than the first threshold SH1 (step S150). Here, the processing of step S150 will be described.

As described above, in the embodiment, the peak value PK includes the six types of peak values. Therefore, hereinafter, as an example, a case where the first threshold SH1 includes the six types of threshold values will be described. The six types of threshold values included in the first threshold value SH1 include threshold values for each of the first peak value to the sixth peak value described above. In this case, the reset processing unit 364A performs the six types of determinations in step S150.

The six types of determinations performed in step S150 include determination on the first peak value, determination on the second peak value, determination on the third peak value, determination on the fourth peak value, determination on the fifth peak value, and determination on the sixth peak value.

The determination on the first peak value performed in step S150 is determination for determining whether or not the first peak value among the six types of peak values included in the peak value PK calculated by the peak value calculation processing immediately before is equal to or greater than the threshold value for the first peak value among the six types of threshold values included in the first threshold value SH1. When the determination on the first peak value performed in step S150 is determination that the first peak value is equal to or greater than the threshold value, for example, a first flag on the determination is set to 0. Meanwhile, when the determination on the first peak value performed in step S150 is determination that the first peak value is less than the threshold value, for example, the first flag on the determination is set to 1.

Since the description of the determination of the second peak value performed in step S150 is the same as the description of replacing the first peak value with the second peak value in the description of the determination on the above-described first peak value, the description thereof will be omitted. Since the description of the determinations on each of the third peak value to the sixth peak value performed in step S150 is the same as the description of the determination on the second peak value performed in step S150, the description thereof is omitted.

In step S150, for example, when there are one or more determinations that the first flag becomes 0 in the determinations on each of the first peak value to the sixth peak value, the reset processing unit 364A determines that the peak value PK calculated by the peak value calculation processing immediately before is equal to or greater than the first threshold value SH1. Meanwhile, in step S150, for example, when there is no determination that the first flag becomes 0 in the determinations on each of the first peak value to the sixth peak value, the reset processing unit 364A determines that the peak value PK calculated by the peak value calculation processing immediately before is less than the first threshold value SH1. In addition, in step S150, the reset processing unit 364A may be configured to determine whether or not the peak value PK calculated by the peak value calculation processing immediately before is equal to or greater than the first threshold value SH1 by another method corresponding to the first flag in the determinations on each of the first peak value to the sixth peak value.

When it is determined that that peak value PK calculated by the peak value calculation processing executed immediately before is equal to or greater than the first threshold SH1 (YES in step S150), the reset processing unit 364A transitions to step S190 and waits the number of times of reset of the predetermined period. Meanwhile, when it is determined that that peak value PK calculated by the peak value calculation processing executed immediately before is less than the first threshold SH1 (No in step S150), the reset processing unit 364A transitions to step S160. In this manner, the processing of step S150 is an example of the above-described second processing. Further, the processing sequentially executed from YES in step S150 to step S190, step S200, and step S120 is an example of the above-described third processing. In addition, the processing sequentially executed from NO in step S150 to NO in step S160, NO in step S170, YES in step S130, NO in step S140, and step S150 is an example of the above-described fourth processing.

Here, specific examples of the six types of threshold values included in the first threshold value SH1 will be described.

Among the threshold values included in the first threshold value SH1, the threshold value for the first peak value is, for example, 5 N. In addition, the threshold value for the first peak value may be a value smaller than 5 N or may be a value greater than 5 N.

Among the threshold values included in the first threshold value SH1, the threshold value for the second peak value is, for example, 5 N. In addition, the threshold value for the second peak value may be a value smaller than 5 N or may be a value greater than 5 N. Further, the threshold value for the second peak value may be a value different from the threshold value for the first peak value among the threshold values included in the first threshold value SH1.

Among the threshold values included in the first threshold value SH1, the predetermined first threshold value for the third peak value is, for example, 5 N. In addition, the threshold value for the third peak value may be a value smaller than 5 N or may be a value greater than 5 N. Further, the threshold value for the third peak value may be a value different from any one or both of the threshold value for the first peak value among the threshold values included in the first threshold value SH1 and the threshold value for the second peak value among the threshold values included in the first threshold value SH1.

Among the threshold values included in the first threshold value SH1, the threshold value for the fourth peak value is, for example, 50 N·mm. In addition, the threshold value for the fourth peak value may be a value smaller than 50 N·mm or may be a value greater than 50 N·mm.

Among the threshold values included in the first threshold value SH1, the threshold value for the fifth peak value is, for example, 5 N·mm. In addition, the threshold value for the fifth peak value may be a value smaller than 5 N·mm or may be a value greater than 5 N·mm. Further, the threshold value for the fifth peak value may be a value different from the threshold value for the fourth peak value among the threshold values included in the first threshold value SH1.

Among the threshold values included in the first threshold value SH1, the threshold value for the sixth peak value is, for example, 50 N·mm. In addition, the threshold value for the sixth peak value may be a value smaller than 50 N·mm or may be a value greater than 50 N·mm. Further, the threshold value for the sixth peak value may be a value different from any one or both of the threshold value for the fourth peak value among the threshold values included in the first threshold value SH1 and the threshold value for the fifth peak value among the threshold values included in the first threshold value SH1.

The sizes of each of the six types of threshold values included in the first threshold value SH1 is determined corresponding to, for example, the magnitude of the vibration applied from outside the robot 20 to the force detection unit FS. In addition, instead of the method, the sizes of each of the six types of threshold values may be configured to be determined by another method.

In step S160, the reset processing unit 364A determines whether or not the fourth period elapsed from the timing T, and the peak value PK calculated by the peak value calculation processing executed immediately before is less than a predetermined second threshold value SH2 (step S160). The fourth period is a period shorter than the first period and longer than the first standby period. The fourth period is, for example, 100 milliseconds. In addition, the second threshold value SH2 is a threshold value smaller than the first threshold value SH1. Here, as described above, in the embodiment, the peak value PK includes the six types of peak values. Therefore, hereinafter, as an example, a case where the second threshold SH2 includes the six types of threshold values will be described. The six types of threshold values included in the second threshold value SH2 include threshold values for each of the first peak value to the sixth peak value described above. In this case, the reset processing unit 364A performs the six types of determinations in step S160.

The six types of determinations performed in step S160 include the determination on the first peak value, the determination on the second peak value, the determination on the third peak value, the determination on the fourth peak value, the determination on the fifth peak value, and the determination on the sixth peak value.

The determination on the first peak value performed in step S160 is determination for determining whether or not the first peak value among the six types of peak values included in the peak value PK calculated by the peak value calculation processing immediately before is equal to or greater than the threshold value for the first peak value among the six types of threshold values included in the second threshold value SH2. When the determination on the first peak value performed in step S160 is determination that the first peak value is equal to or greater than the threshold value, for example, a second flag on the determination is set to 0. Meanwhile, when the determination on the first peak value performed in step S160 is determination that the first peak value is less than the threshold value, for example, the second flag on the determination is set to 1.

Since the description of the determination of the second peak value performed in step S160 is the same as the description of replacing the first peak value with the second peak value in the description of the determination on the above-described first peak value, the description thereof will be omitted. Since the description of the determination on each of the third peak value to the sixth peak value performed in step S160 is the same as the description of the determination on the second peak value performed in step S160, the description thereof is omitted.

In step S160, for example, when there are one or more determinations that the second flag becomes 0 in the determinations on each of the first peak value to the sixth peak value, the reset processing unit 364A determines that the peak value PK calculated by the peak value calculation processing immediately before is equal to or greater than the second threshold value SH2. Meanwhile, in step S160, for example, when there is no determination that the second flag becomes 0 in the determinations on each of the first peak value to the sixth peak value, the reset processing unit 364A determines that the peak value PK calculated by the peak value calculation processing immediately before is not equal to or greater than the second threshold value SH2. In addition, in step S160, the reset processing unit 364A may be configured to determine whether or not the peak value PK calculated by the peak value calculation processing immediately before is equal to or greater than the second threshold value SH2 by another method that corresponds to the second flag in the determination on each of the first peak value to the sixth peak value.

Here, specific examples of the six types of threshold values included in the second threshold value SH2 will be described.

Among the threshold values included in the second threshold value SH2, the threshold value for the first peak value is, for example, 0.25 N. In addition, the threshold value for the first peak value may be a value smaller than 0.25 N or may be a value greater than 0.25 N.

Among the threshold values included in the second threshold value SH2, the threshold value for the second peak value is, for example, 0.25 N. In addition, the threshold value for the second peak value may be a value smaller than 0.25 N or may be a value greater than 0.25 N. Further, the threshold value for the second peak value may be a value different from the threshold value for the first peak value among the threshold values included in the second threshold value SH2.

Among the threshold values included in the second threshold value SH2, the predetermined second threshold value for the third peak value is, for example, 0.25 N. In addition, the predetermined second threshold value for the third peak value may be a value smaller than 0.25 N or may be a value greater than 0.25 N. Further, the predetermined second threshold value for the third peak value may be a value different from any one or both of the threshold value for the first peak value among the threshold values included in the second threshold value SH2 and the threshold value for the second peak value among the threshold values included in the second threshold value SH2.

Among the threshold values included in the second threshold value SH2, the threshold value for the fourth peak value is, for example, 15 N·mm. In addition, among the threshold values included in the second threshold value SH2, the threshold value for the fourth peak value may be a value smaller than 15 N·mm or may be a value greater than 15 N·mm.

Among the threshold values included in the second threshold value SH2, the threshold value for the fifth peak value is, for example, 15 N·mm. In addition, among the threshold values included in the second threshold value SH2, the threshold value for the fifth peak value may be a value smaller than 15 N·mm or may be a value greater than 15 N·mm. Further, among the threshold values included in the second threshold value SH2, the threshold value for the fifth peak value may be a value different from the threshold value for the fourth peak value among the threshold values included in the second threshold value SH2.

Among the threshold values included in the second threshold value SH2, the threshold value for the sixth peak value is, for example, 15 N·mm. In addition, among the threshold values included in the second threshold value SH2, the threshold value for the sixth peak value may be a value smaller than 15 N·mm or may be a value greater than 15 N·mm. Further, among the threshold values included in the second threshold value SH2, the threshold value for the sixth peak value may be a value different from any one or both of the threshold value for the fourth peak value among the threshold values included in the second threshold value SH2 and the threshold value for the fifth peak value among the threshold values included in the second threshold value SH2.

The sizes of each of the six types of threshold values included in the second threshold SH2 is determined corresponding to, for example, the sensitivity of the force detection unit FS, the weight of the end effector E, and the like. In addition, instead of the method, the sizes of each of the six types of threshold values may be configured to be determined by another method.

When it is determined that the fourth period elapsed from the timing T and the peak value PK calculated by the peak value calculation processing immediately before is less than the second threshold value SH2 (YES in step S160), the reset processing unit 364A ends the average value calculation processing (step S180). Further, in this case, the reset processing unit 364A ends each of the clocking processing and the peak value calculation processing. In addition, the reset processing unit 364A specifies the offset value that corresponds to each of the six types of output values based on each of the six types of average values calculated by the average value calculation processing executed immediately before. More specifically, the reset processing unit 364A specifies the average value of the output values as an offset value that corresponds to the output value, for each of the six types of output values.

For example, the reset processing unit 364A specifies the average value of the output values that correspond to the first translational force among the six types of average values calculated by the average value calculation processing executed immediately before, as an offset value that corresponds to the output value.

In addition, for example, the reset processing unit 364A specifies the average value of the output values that correspond to the second translational force among the six types of average values calculated by the average value calculation processing executed immediately before, as an offset value that corresponds to the output value.

In addition, for example, the reset processing unit 364A specifies the average value of the output values that correspond to the third translational force among the six types of average values calculated by the average value calculation processing executed immediately before, as an offset value that corresponds to the output value.

In addition, for example, the reset processing unit 364A specifies the average value of the output values that correspond to the first angular moment among the six types of average values calculated by the average value calculation processing executed immediately before, as an offset value that corresponds to the output value.

In addition, for example, the reset processing unit 364A specifies the average value of the output values that correspond to the second angular moment among the six types of average values calculated by the average value calculation processing executed immediately before, as an offset value that corresponds to the output value.

In addition, for example, the reset processing unit 364A specifies the average value of the output values that correspond to the third angular moment among the six types of average values calculated by the average value calculation processing executed immediately before, as an offset value that corresponds to the output value.

After specifying the six types of offset values in this manner, the reset processing unit 364A stores each of the specified six types of offset values in the memory 32, and ends the processing.

Meanwhile, when it is determined that the fourth period did not elapse from the timing T or the peak value PK calculated by the peak value calculation processing immediately before is equal to or greater than the second threshold SH2 (No in step S160), the reset processing unit 364A determines whether or not the above-described first period elapsed from the timing T (step S170).

When it is determined that the first period did not elapse from the timing T (No in step S170), the reset processing unit 364A transitions to step S130, and determines again whether or not the first standby period elapsed from the timing T. Meanwhile, when it is determined that the first period elapsed from the timing T (YES in step S170), the reset processing unit 364A transitions to step S180 and ends the average value calculation processing. Further, in this case, the reset processing unit 364A ends each of the clocking processing and the peak value calculation processing. In addition, the reset processing unit 364A specifies the offset value that corresponds to each of the six types of output values based on each of the six types of average values calculated by the average value calculation processing executed immediately before. After the processing of step S180 is performed, the reset processing unit 364A ends the processing.

In this manner, the processing sequentially executed from NO in step S150 to NO in step S160, Yes in step S170, and step S180 is an example of the above-described fifth processing. In addition, the processing of step S160 is an example of the above-described sixth processing. Further, the processing sequentially executed from NO in step S150 to Yes in step S160 and step S180 is an example of the above-described seventh processing.

As described above, the robot control device 30 can execute the reset processing and retry of the reset processing by the processing of the flowchart illustrated in FIG. 4. Accordingly, the robot control device 30 can suppress specifying of the abnormal values as each offset value, stopping of the operation of the robot 20 when the force detection unit FS is in the error state, and the like. Further, accordingly, it is not necessary for the robot control device 30 to cause the robot 20 to perform an operation in which the state of the robot 20 is a state where no vibration is applied to the force detection unit FS from the outside of the robot 20. The operation includes movement, waiting, and the like. As a result, the robot control device 30 can suppress the deterioration in efficiency with which the robot 20 performs work by the operation. In addition, the robot control device 30 can reduce the time required for work.

Further, since the robot control device 30 performs the reset processing according to the processing of the flowchart illustrated in FIG. 4, the output value output from the force detection unit FS is not specified as the offset value at the timing when the force detection unit FS is reset, and the average value of the output values is specified as the offset value. Accordingly, it is possible to specify an appropriate offset value regardless of the magnitude of the amplitude of the vibration applied to the force detection unit FS.

In addition, in the processing of the flowchart illustrated in FIG. 4, even when an output value that can be an abnormal value is output from force detection unit FS, or even when the state of force detection unit FS is the error state, each determination processing of repetitive step S130 to step S170 is repeatedly executed. Therefore, in the robot control device 30, the user reduces the trouble of writing a code that repeats the reset processing in the cases in the operation program.

Here, among the above-described processing, the processing executed in the order of step S150, step S190, step S200, and step S120 is processing for waiting until the peak value PK of the output values output from the force detection unit FS in the period P1 from the timing T to the present timing becomes a value appropriate for calculating the offset value. Therefore, it is considered that the peak value PK is not appropriate for calculating the offset value as the number of times the execution of the processing increases. For example, the greater the number of times, the higher the possibility that vibration having a large amplitude or vibration that is unlikely to attenuate is applied to the force detection unit FS from the outside of the robot 20. Therefore, in step S190, the reset processing unit 364A extends the standby period each time the processing of step S190 is executed. Accordingly, the robot control device 30 can more reliably wait until the peak value PK becomes a value appropriate for calculating the offset value. However, as the number of times increases, efficiency of work performed by the robot 20 is reduced. Here, the reset processing unit 364A performs the error processing in step S210 when the number of times of reset reaches a predetermined number of times or more by the processing of step S200. Accordingly, the robot control device 30 can suppress the deterioration in efficiency of work performed by the robot 20 as the number of times of repetition of the reset processing increases.

Further, among the above-described processing, the processing executed in the order of step S160 and step S180 is processing for calculating the offset value without waiting for the elapse of the first period when the vibration applied to the force detection unit FS sufficiently attenuates at the timing before the first period elapses. Accordingly, the robot control device 30 can reduce the time required to calculate the offset value. As a result, the robot control device 30 can suppress deterioration in efficiency of work by the reset processing.

In addition, among the above-described processing, since the processing of step S160 uses the peak value PK of the output values output from the force detection unit FS in the period P1 from the timing T to the present timing, regardless of the fact that the peak value PK is ignorably small, there is a case where the peak value PK is small as the maximum value of the output values is unignorably large and the minimum value of the output values is unignorably small. In order to suppress such a problem, the processing may include processing for determining whether or not any one or both of the maximum value and the minimum value are equal to or greater than a predetermined threshold value.

In addition, in the processing of step S160 described above, when it is determined that the fourth period elapsed from the timing T and the peak value PK calculated by the peak value calculation processing immediately before is less than the second threshold value SH2, the reset processing unit 364A may be configured to set each offset value to 0 in step S180. This is because, in such a case, each offset value is often specified as a value close to 0 in step S180.

In addition, the processing of the flowchart illustrated in FIG. 4 is executed, for example, at a timing before the robot control device 30 causes the robot 20 to perform the force control. Here, when the posture of the robot 20 at the time of executing the processing and the posture of the robot 20 at the time of causing the robot 20 to perform the force control do not match each other, the robot control device 30 performs gravity compensation together with the processing. Accordingly, even in this case, the robot control device 30 can cause the robot 20 to perform work with high accuracy by the force control based on the output value output from the force detection unit FS.

Further, the processing of the flowchart illustrated in FIG. 4 is executed, for example, each time a predetermined cycle elapses. Accordingly, the robot control device 30 can suppress that accuracy of work performed by the robot 20 deteriorates due to an error caused by the drift of the output value output from the force detection unit FS due to temperature, an error integrated by calculation, and the like. In addition, although the cycle is approximately several minutes, for example, the present disclosure is not necessarily limited thereto.

In addition, the robot control device 30 may be configured to execute the processing of the flowchart illustrated in FIG. 4 in parallel for each of the six types of output values.

Figure 5:
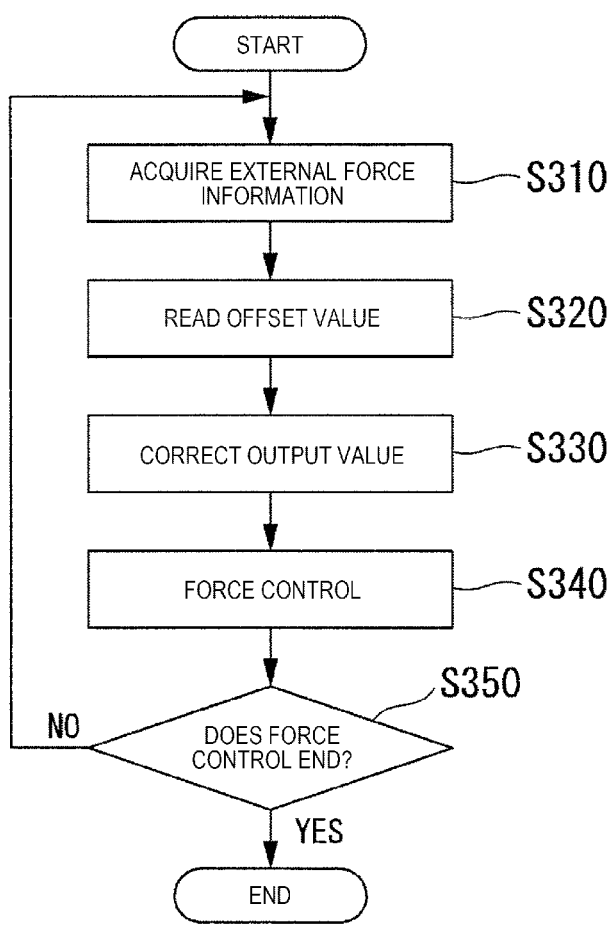
FIG. 5 is a view illustrating an example of the flow of processing in which the robot control device causes a robot to operate by force control.

Processing in which Robot Control Device Causes Robot to Operate by Force Control Hereinafter, with reference to FIG. 5, processing in which the robot control device 30 causes the robot 20 to operate by the force control will be described. FIG. 5 is a view illustrating an example of the flow of the processing in which the robot control device 30 causes the robot 20 to operate by the force control. In addition, the robot control device 30 executes the processing of the flowchart illustrated in FIG. 5 based on, for example, the operation program stored in advance in the memory 32. In addition, the robot control device 30 may be configured to execute the processing corresponding to the operation received from the user via another information processing device connected to the robot control device 30, and may be configured to execute the processing by another method.

The first acquisition unit 361 acquires the external force information from the force detection unit FS (step S310).

Next, the correction unit 364B reads each of the six types of offset values stored in advance in the memory 32 by the processing of the flowchart illustrated in FIG. 4 (step S320). Here, the offset value read from the memory 32 by the correction unit 364B in step S320 is an offset value stored in the memory 32 in the processing executed immediately before among the processing executed in the order of step S160 and step S180 in the processing of the flowchart illustrated in FIG. 4 and the processing executed in the order of step S160, step S170, and step S180 in the processing of the flowchart illustrated in FIG. 4.

Next, the correction unit 364B corrects the six types of output values indicated by the external force information acquired by the first acquisition unit 361 in step S310 based on the six types of offset values read from the memory 32 in step S320 (step S330). Specifically, for each of the six types of output values, the correction unit 364B corrects the output values by adding or subtracting the offset value that corresponds to the output value among the six types of offset values to or from the output value. Here, the method by which the correction unit 364B corrects the output value using the offset value is not limited thereto, and another method may be used. In other words, the method by which the correction unit 364B corrects the output value by the offset value may be a known method or may be a method to be developed hereinafter. In addition, for each of the six types of output values, the correction unit 364B may be configured to correct the output values by another method based on the offset value that corresponds to the output value among the six types of offset values.

Next, the manipulator control unit 366 causes the manipulator M to operate by the force control based on the six output values corrected by the correction unit 364B in step S330 (step S340).

Next, the manipulator control unit 366 determines whether to end the operation of the manipulator M by the force control (step S350). In the embodiment, the manipulator control unit 366 determines whether to end the operation of the manipulator M by the force control based on the operation program. When the manipulator control unit 366 determines that the operation of the manipulator M by the force control is not ended (No in step S350), the first acquisition unit 361 transitions to step S310 and acquires the external force information from the force detection unit FS again. Meanwhile, the manipulator control unit 366 ends the processing when it is determined to end the operation of the manipulator M by the force control (Yes in step S350).

In addition, the above-described peak value PK may be configured to include some of the six types of peak values.

Modification Example of Embodiment

Figure 6:
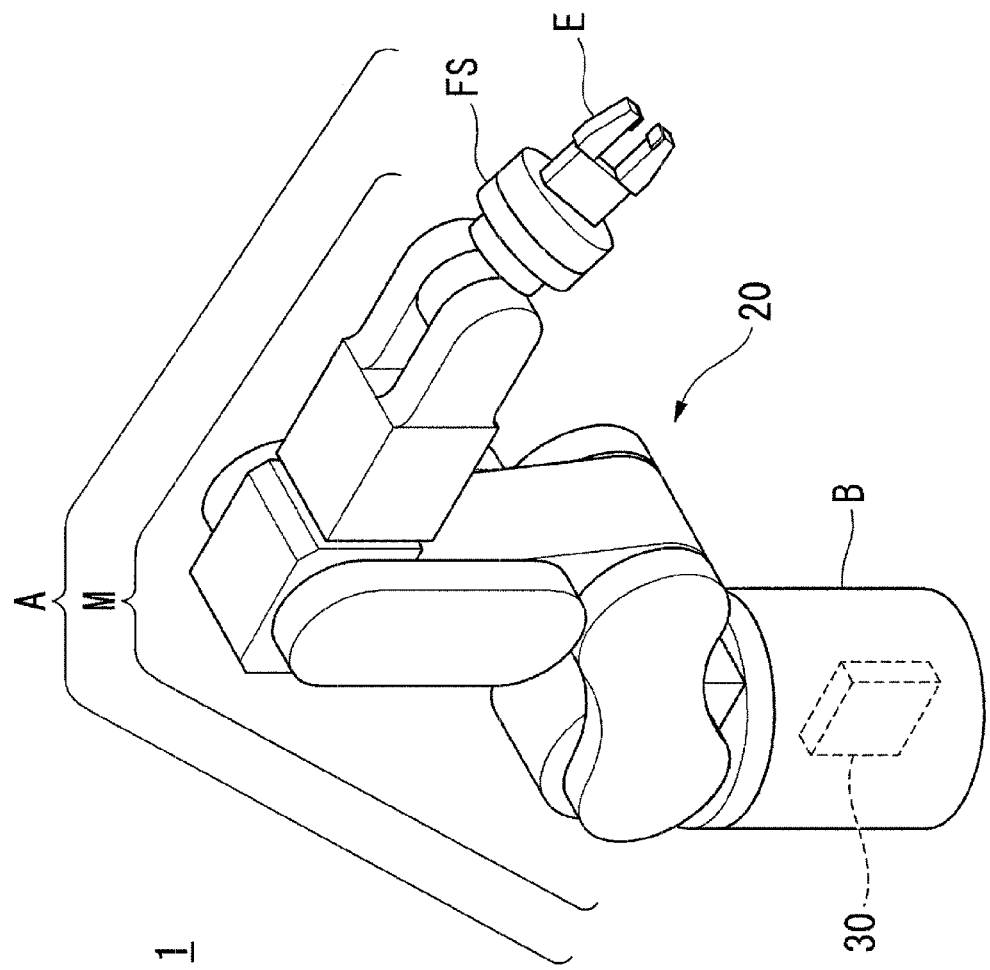
FIG. 6 is a view illustrating an example of a configuration of a robot system according to a modification example of the embodiment.

Hereinafter, a modification example of the embodiment will be described with reference to FIG. 6. FIG. 6 is a view illustrating an example of a configuration of the robot system 1 according to the modification example of the embodiment. In the robot system 1 according to the modification example of the embodiment, the robot 20 incorporates the robot control device 30 as illustrated in FIG. 1. In other words, the robot system 1 includes the robot 20 that incorporates the robot control device 30.

Accordingly, even when the robot control device 30 is incorporated in the robot 20, the robot system 1 can cause the robot to perform work with high accuracy by the control based on the output value output from the force detection unit.

As described above, there is provided a robot system (robot system 1 in the embodiment) according to the embodiment including: a robot (robot 20 in the embodiment); a force detection unit (force detection unit FS in the embodiment) that detects an external force applied to the robot; a reset processing unit (reset processing unit 364A in the embodiment) that performs reset processing of the force detection unit; and a correction unit (correction unit 364B in the embodiment) that performs correction corresponding to the reset processing by the reset processing unit, in which the reset processing includes first processing for resetting the force detection unit, second processing for determining whether or not a peak value (peak value PK in the embodiment) of output values output from the force detection unit is equal to or greater than a predetermined first threshold value (first threshold value SH1 in the embodiment) in a predetermined first period and updating a determination result, third processing for executing the first processing when the determination result indicates that the peak value is equal to or greater than the first threshold value, fourth processing for executing the second processing when the determination result indicates that the peak value is not equal to or greater than the first threshold value and a predetermined second period did not elapse from a timing at which the force detection unit is reset by the first processing, and fifth processing for calculating an average value of the output values in a predetermined third period as a first offset value when the determination result indicates that the peak value is not equal to or greater than the first threshold value and the second period elapsed from the timing, and in which the correction unit performs correction of adding or subtracting the first offset value to or from the output value after the reset processing when the fifth processing is executed by the reset processing unit.

Further, in the robot system, a configuration in which the first period and the third period overlap each other may be used.

In addition, in the robot system, the reset processing includes sixth processing for determining whether or not the peak value of the output values output from the force detection unit is less than a second threshold value smaller than the first threshold, and seventh processing for calculating an average value of the output values in a fourth period shorter than the third period as a second offset value when the determination result updated by the second processing indicates that the peak value is equal to or greater than the first threshold value and it is determined that the peak value is less than the second threshold value in the sixth processing, and the correction unit performs correction of adding or subtracting the second offset value to or from the output value after the reset processing when the seventh processing is executed by the reset processing unit.

Above, although the embodiment of the present disclosure was described in detail with reference to the drawings, a specific configuration is not limited to the embodiment, and change, substitution, deletion and the like may be employed as long as the change, substitution, deletion and the like do not depart from the gist of the present disclosure.

Further, a program for realizing the function of an arbitrary configuration unit in the above-described device may be recorded in a computer-readable recording medium and executed by reading the program by a computer system. The device is, for example, the robot control device 30 or the like. In addition, the "computer system" referred here includes hardware, such as an operating system (OS) and peripheral devices. In addition, the term "computer-readable recording medium" refers to a flexible disk, a magneto-optical disk, a ROM, a portable medium, such as a compact disk (CD)-ROM, and a storage device, such as a hard disk or the like built in the computer system. Furthermore, the "computer-readable recording medium" includes a medium that holds the program for a certain period of time, such as a volatile memory (RAM) in the computer system as a server or client when the program is transmitted via a network, such as the Internet, or a communication line, such as a telephone line.

In addition, the above-described program may be transmitted from the computer system in which the program is stored in a storage device or the like to another computer system via a transmission medium or by a transmission wave in the transmission medium. Here, the "transmission medium" for transmitting the program is a medium having a function of transmitting information similar to a network (communication network), such as the Internet, or a communication line, such as a telephone line.

In addition, the above-described program may be a program for realizing a part of the above-described functions. Furthermore, the above-described program may be a program that can realize the above-described functions in combination with a program already recorded in the computer system, that is, a so-called difference file, a difference program, or the like.

What is claimed is:
1. A robot system comprising:
a robot;
a force detection unit that detects an external force applied to the robot;
a reset processing unit that performs reset processing of the force detection unit; and
a correction unit that performs correction corresponding to the reset processing by the reset processing unit, wherein
the reset processing includes
first processing for resetting the force detection unit,
second processing for determining whether or not a peak value of output values output from the force detection unit is equal to or greater than a predetermined first threshold value in a predetermined first period and updating a determination result,
third processing for executing the first processing when the determination result indicates that the peak value is equal to or greater than the first threshold value,
fourth processing for executing the second processing when the determination result indicates that the peak value is not equal to or greater than the first threshold value and a predetermined second period did not elapse from a timing at which the force detection unit is reset by the first processing, and
fifth processing for calculating an average value of the output values in a predetermined third period as a first offset value when the determination result indicates that the peak value is not equal to or greater than the first threshold value and the second period elapsed from the timing, and
the correction unit performs correction of adding or subtracting the first offset value to or from the output value after the reset processing when the fifth processing is executed by the reset processing unit.
2. The robot system according to claim 1, wherein the first period and the third period overlap each other.

3. The robot system according to claim 1, wherein
the reset processing includes
- sixth processing for determining whether or not the peak value is less than a second threshold value smaller than the first threshold, and
- seventh processing for calculating an average value of the output values in a fourth period shorter than the third period as a second offset value when the determination result indicates that the peak value is not equal to or greater than the first threshold value and it is determined that the peak value is less than the second threshold value in the sixth processing, and the correction unit performs correction of adding or subtracting the second offset value to or from the output value after the reset processing when the seventh processing is executed by the reset processing unit.

4. A robot comprising:
an arm;
a force detection unit that detects an external force applied to the arm;
a reset processing unit that performs reset processing of the force detection unit; and
a correction unit that performs correction corresponding to the reset processing by the reset processing unit, wherein
the reset processing includes
- first processing for resetting the force detection unit,
- second processing for determining whether or not a peak value of output values output from the force detection unit is equal to or greater than a predetermined first threshold value in a predetermined first period and updating a determination result,
- third processing for executing the first processing when the determination result indicates that the peak value is equal to or greater than the first threshold value,
- fourth processing for executing the second processing when the determination result indicates that the peak value is not equal to or greater than the first threshold value and a predetermined second period did not elapse from a timing at which the force detection unit is reset by the first processing, and
- fifth processing for calculating an average value of the output values in a predetermined third period as a first offset value when the determination result indicates that the peak value is not equal to or greater than the first threshold value and the second period elapsed from the timing, and the correction unit performs correction of adding or subtracting the first offset value to or from the output value after the reset processing when the fifth processing is executed by the reset processing unit.

5. A control method for controlling a robot, comprising:
reset processing for performing reset processing of a force detection unit that detects an external force applied to the robot; and
correcting for performing correction corresponding to the reset processing in the reset processing, wherein
the reset processing includes
- first processing for resetting the force detection unit,
- second processing for determining whether or not a peak value of output values output from the force detection unit is equal to or greater than a predetermined first threshold value in a predetermined first period and updating a determination result,
- third processing for executing the first processing when the determination result indicates that the peak value is equal to or greater than the first threshold value,
- fourth processing for executing the second processing when the determination result indicates that the peak value is not equal to or greater than the first threshold value and a predetermined second period did not elapse from a timing at which the force detection unit is reset by the first processing, and
- fifth processing for calculating an average value of the output values in a predetermined third period as a first offset value when the determination result indicates that the peak value is not equal to or greater than the first threshold value and the second period elapsed from the timing, and in the correcting, correction of adding or subtracting the first offset value to or from the output value after the reset processing when the fifth processing is executed in the reset processing, is performed.

* * * * *